Sept. 7, 1965   J. H. SPENCE ETAL   3,204,580
RAILWAY VEHICLE MULTI-DECK SUPERSTRUCTURE
Filed July 2, 1962   6 Sheets-Sheet 1
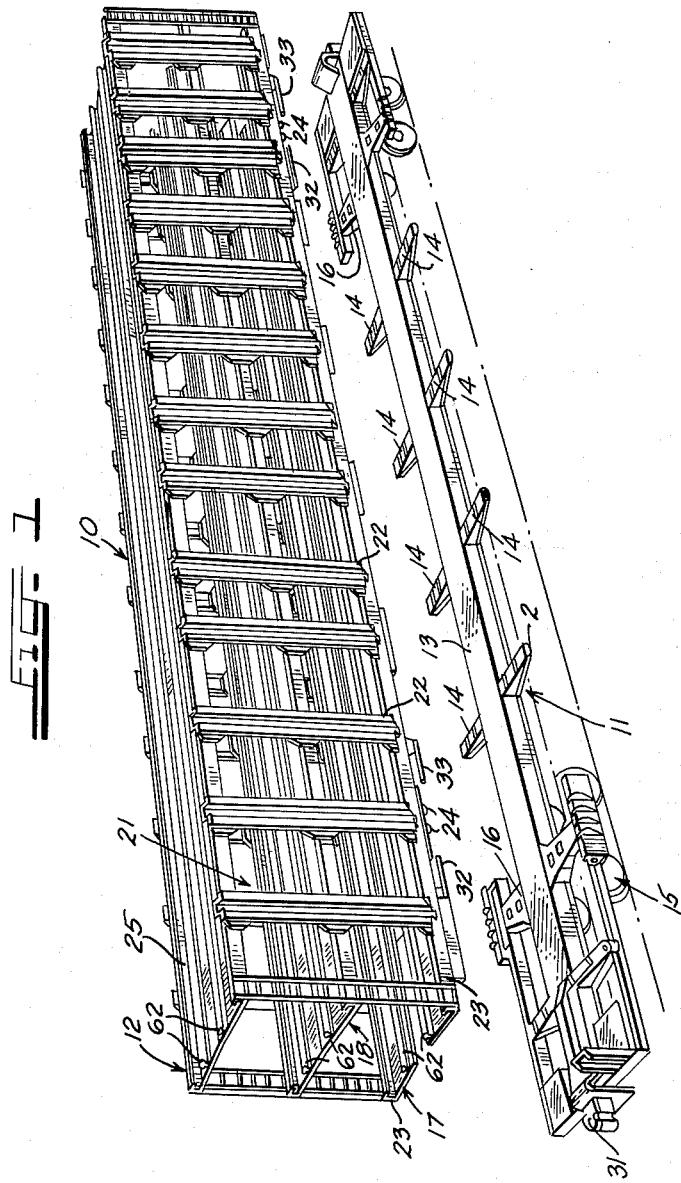
INVENTOR.
JOHN H. SPENCE
RALPH B. BERGSTRAND
BY WILLIAM VAN DER SLUYS Sept. 7, 1965    J. H. SPENCE ETAL    3,204,580
RAILWAY VEHICLE MULTI-DECK SUPERSTRUCTURE
Filed July 2, 1962    6 Sheets-Sheet 2
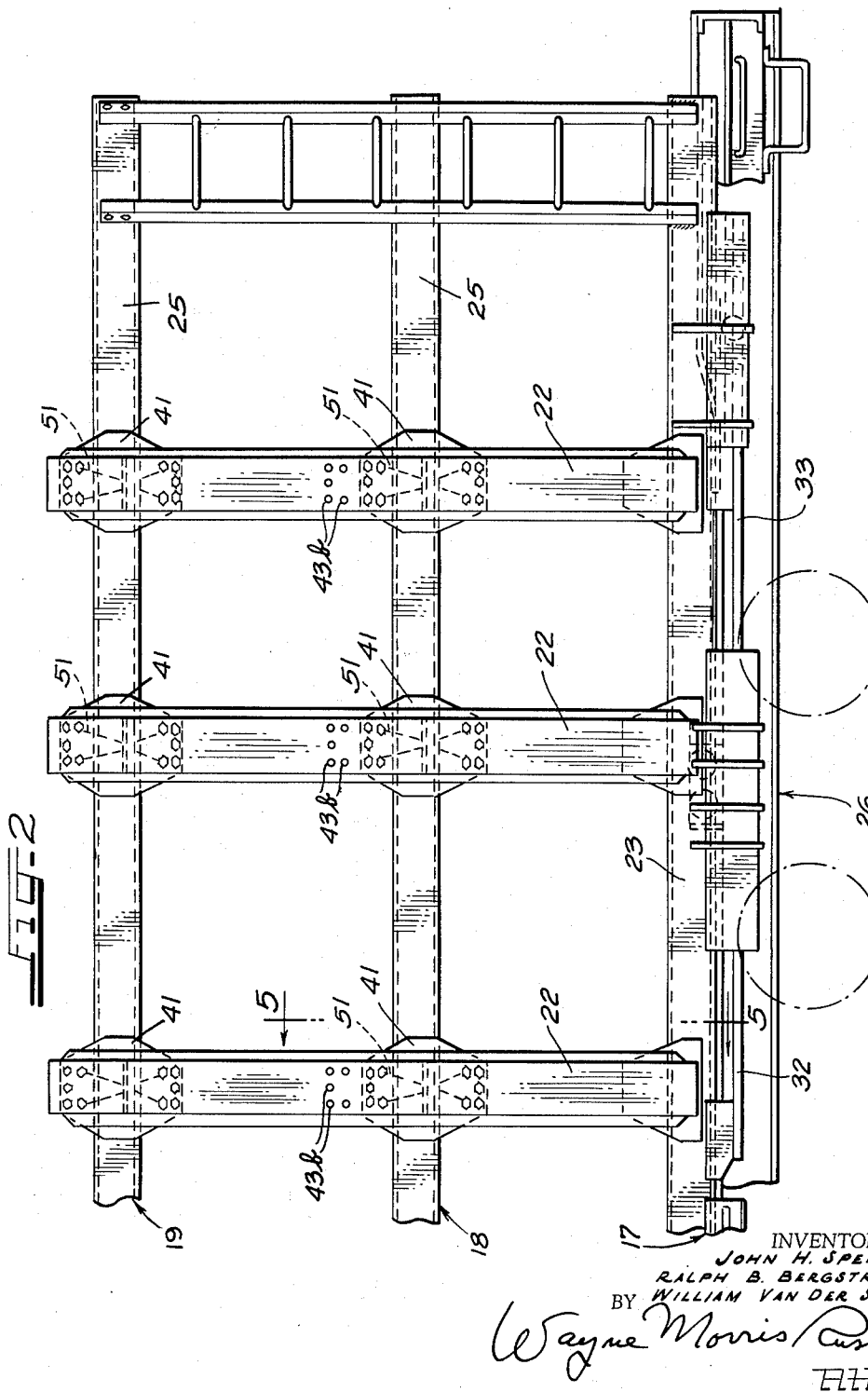

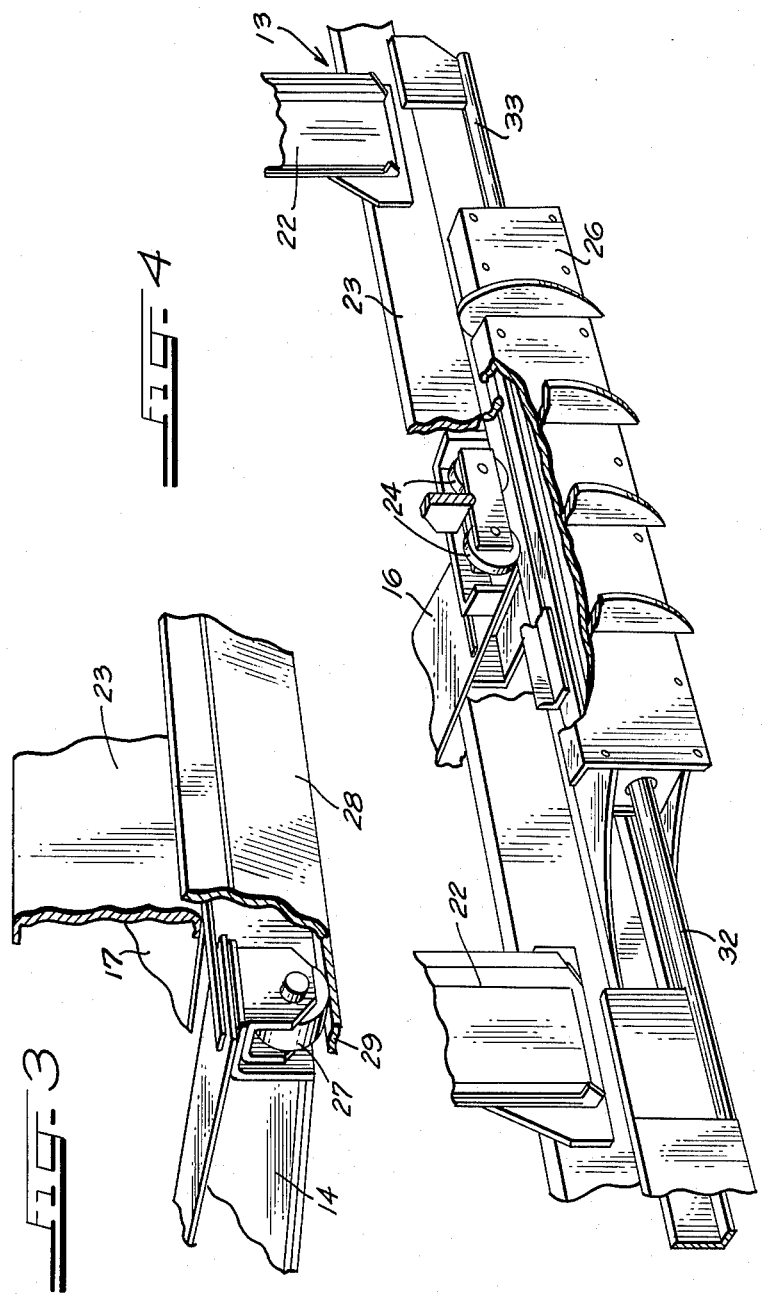

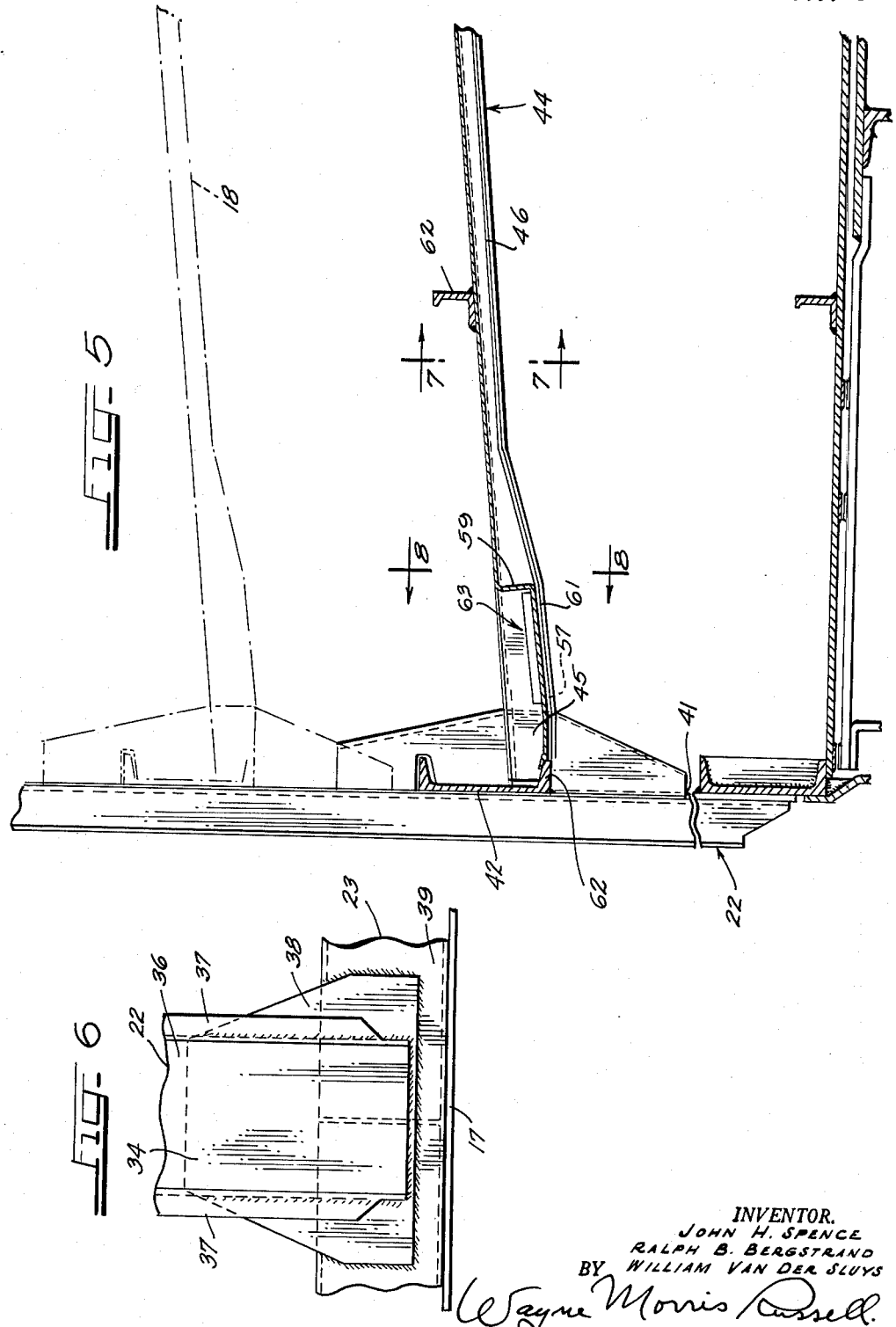

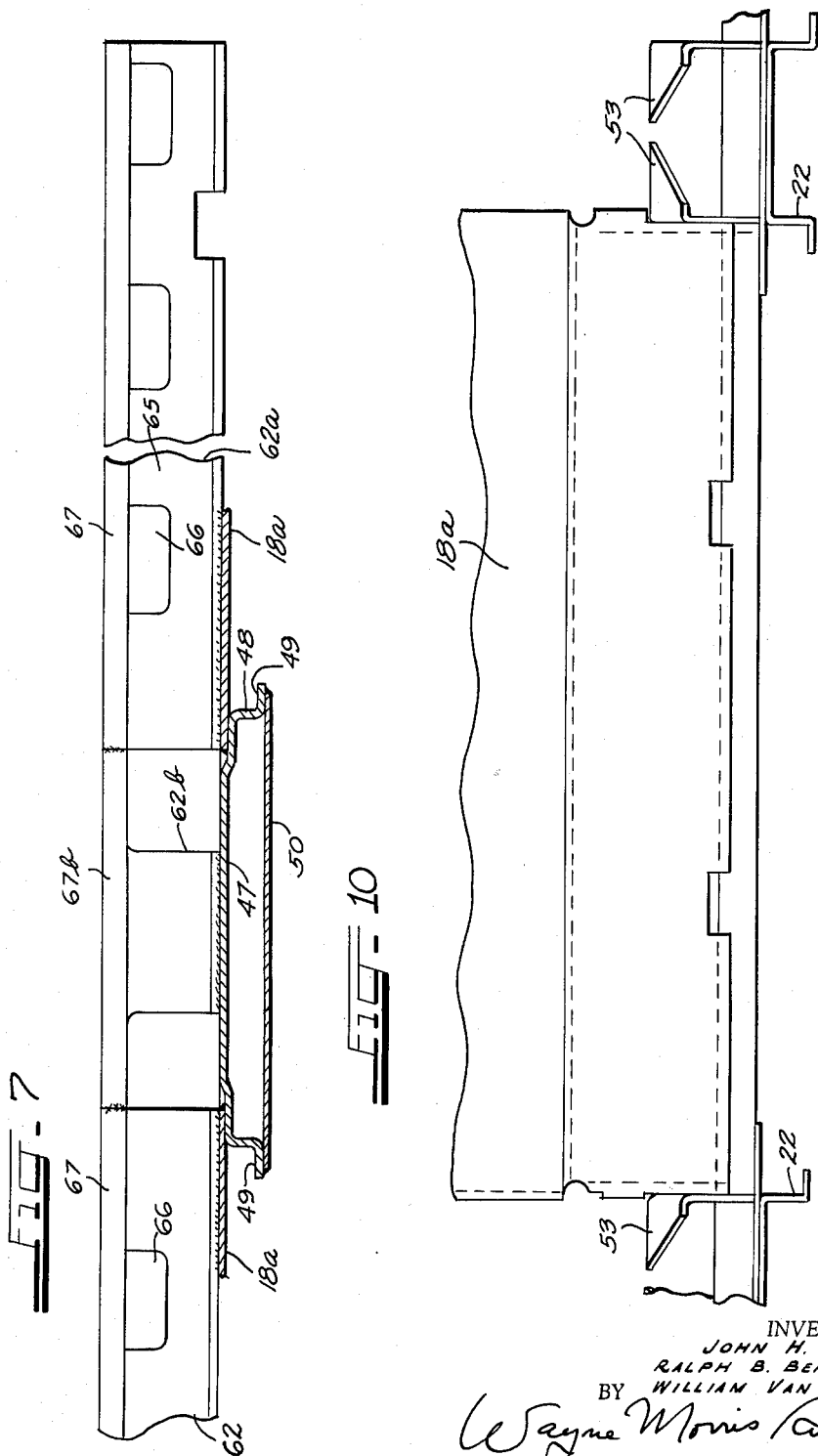

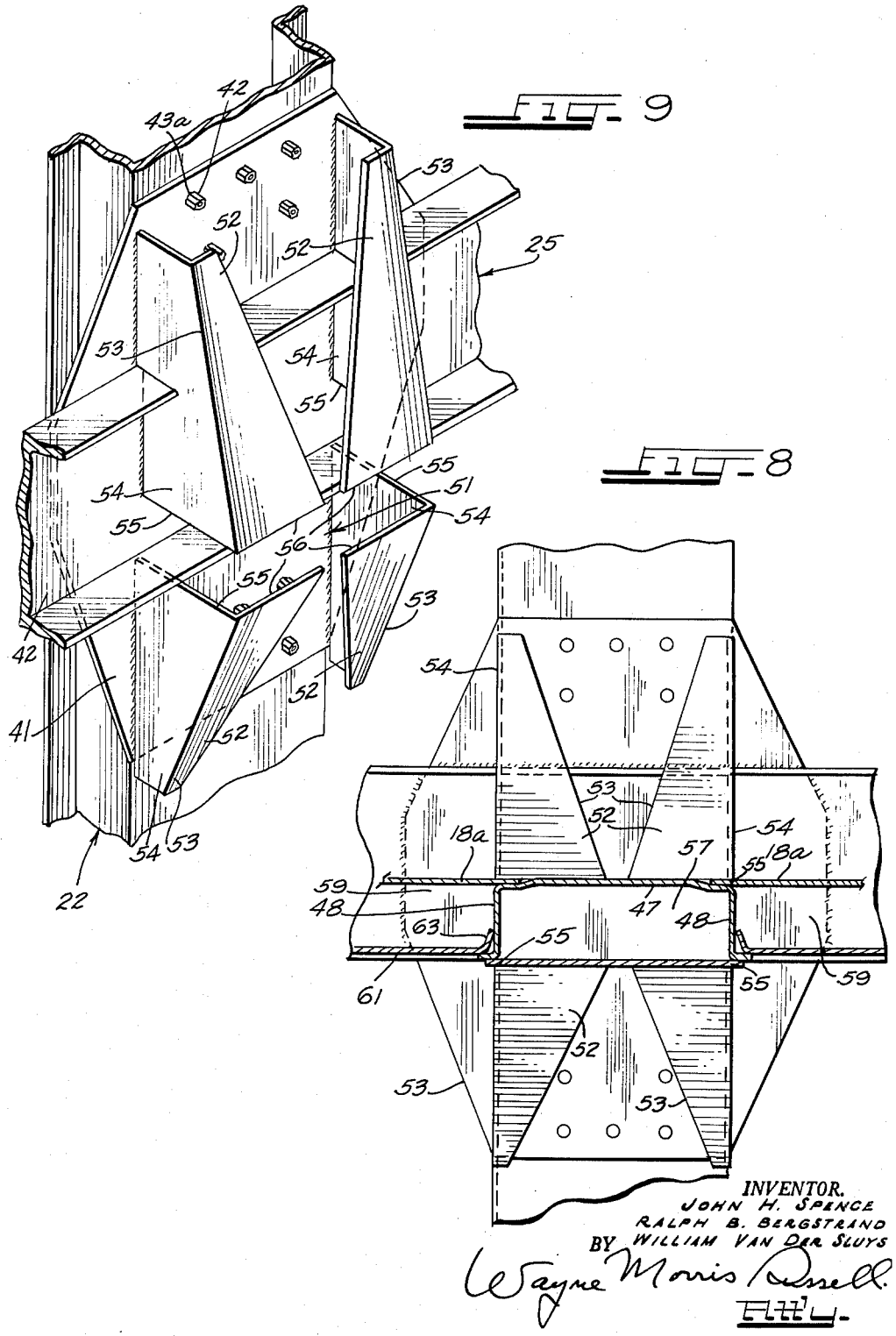

United States Patent Office 3,204,580
Patented Sept. 7, 1965

3,204,580
RAILWAY VEHICLE MULTI-DECK
SUPERSTRUCTURE
John H. Spence, Chicago Heights, and Ralph B. Bergstrand and William Van Der Sluys, Homewood, Ill., assignors to Pullman Incorporated, Chicago, Ill., a corporation of Delaware
Filed July 2, 1962, Ser. No. 206,923
9 Claims. (Cl. 105—368)

This invention relates to railway vehicles and, more particularly, to a railway vehicle superstructure having a multi-deck or tier structure for hauling automotive vehicles, such as trucks or passenger vehicles.

It is a principal object of the invention to provide a lightweight railway car having a superstructure in the form of a multi-deck rack for carrying automotive vehicles thereon and wherein the superstructure is constructed so that the sides thereof include upright members only and preclude the necessity of diagonal cross-braces.

It is a further object to provide a railway car superstructure in the form of a multi-deck rack structure for carrying automotive vehicles thereon wherein said decks are adjustable or removable so as to permit the hauling of either solely trucks or passenger vehicles or a combination of such vehicles.

It is still a further object to provide a railway car with a superstructure in the form of a multi-deck rack wherein the uprights are secured to the decks in a manner maintaining the uprights in a substantially vertical attitude to eliminate the need for diagonal reinforcing cross-braces and the decks are constructed so as to maintain the uprights forming the sides of the superstructure spaced in a rigid rectilinear transverse section.

Further objects and features will hereinafter appear.

In the drawings:

FIG. 1 is an exploded view of a railway car having a superstructure formed in accordance with the present invention;

FIG. 2 is a fragmentary elevational view of the railway car shown in FIG. 1;

FIG. 3 is a fragmentary perspective view showing the structural connection of the underframe with the superstructure at the crossbearers;

FIG. 4 is a fragmentary perspective view showing the structural connection of the underframe with the superstructure at the bolsters;

FIG. 5 is a cross-sectional view of one side of the car, taken substantially along the lines 5—5 of FIG. 2 and showing the deck structure and the bracket structure for attaching the decks to the upright posts of the superstructure;

FIG. 6 is a fragmentary elevational view showing the typical attachment of the upright posts to the lower side channels associated with the bottom deck.

FIG. 7 is a cross-sectional view taken substantially along the lines 7—7 of FIG. 5;

FIG. 8 is a cross-sectional view taken substantially along the lines 8—8 of FIG. 5;

FIG. 9 is a perspective view of tht bracket structure employed to attach the decks to the uprights with the bracing structure of the deck forming the reinforcing spans being omitted for the purpose of clarity; and FIG. 10 is a fragmentary plan view along one side of the upper deck structures showing the drainage well construction formed therein.

Referring now to the drawings, there is illustrated a railway car 10 including generally an underframe 11 and a superstructure 12 which is mounted on the underframe for limited relative lengthwise movement thereof. The underframe includes generally a center sill 13 from which there extends the cross-bearers 14 and bolsters 16. Fastened to the bolsters 16 are the usual trucks 15. The free ends of the bolsters 16 and cross-bearers 14 are detached from each other and the center sill 13 is of substantially uniform section along its length. In the presence of longitudinally distributed loads on the superstructure 12 and due to the weight of the center sill components not directly supported on the trucks 15, the intermediate portion of the sill is subject to bending and, under some circumstances, to buckling. For imparting the necessary strength characteristics to preclude such bend or buckling of the center sill 13 a superstructure 12 is particularly constructed to accomplish this function. The manner in which the superstructure 12 coacts with the underframe 11 so as to impart the necessary strength characteristics thereto, is described in application Serial No. 187,548, filed April 16, 1962, to which reference is made for a more detailed description.

Generally, the superstructure 12 includes an openframe, rack-like structure including a lower deck 17 and upper decks 18 and 19 extending between the sides 21 formed by upright posts 22 longitudinally spaced lengthwise of the car and by lower horizontal side channels 23 associated with the lower deck 17 and intermediate and top side channels 25 associated with the upper decks 18 and 19.

For providing the relative lengthwise movement of the superstructure or rack 12 relative to the underframe 11, in the embodiment shown, wheels 24 are fixed to the lower deck side channels 23. The wheels 24 (FIG. 4) are arranged to ride on the top of cushion pocket structures 26 fixed to the free ends of the bolsters 16, such that, in effect, the superstructure 12 is supported on the bolsters 16.

As shown in FIG. 3, fixed to the side channels 23, and arranged to cooperate with the rollers 27 depending from the free ends of each of the cross-bearers 14 are runners 28 of which a horizontal flange 29 engages the rollers so as to support the ends of the cross-bearers 14. As more fully explained in the aforementioned copending application, with the superstructure or rack 12 thus mounted on the underframe 11 the longitudinally distributed load on the center sill and the weight of the center sill between the trucks 15 is transmitted through the sides 21 of the superstructure 12 to the bolsters 16. In this manner, the necessary strength characteristics are imparted to the center sill 13 by the sides of superstructure 12 supported thereon.

For protecting the superstructure 12 and the load carried thereon from damage caused by impact forces applied on couplers 31 fixed to each end of the center sill 13, there is provided a cushioning arrangement. The cushioning arrangement, as shown, is described in detail in copending application Serial No. 187,786, filed April 16, 1962, and to which reference is made.

The cushioning arrangement includes generally cushion pockets 26 fixed to the free ends of each of the bolsters 16. Supported in the cushion pockets 26 are cushioning devices, not shown, which may be of the resilient or hydraulic types, both of which types are capable of absorbing sufficient energy of impact applied on the couplers 31 so as to prevent damage to the rack and the lading carried thereon. Advantageously, there may be employed cushioning devices embodying the principles of U.S. Patent 3,003,436.

Associated with each of the cushioning devices are rods 32 and 33 fixed on the side channels 23 in longitudinally spaced relationship so that one of the rods 32 extends into one end of the cushion pocket 26 and the other rod 33 extends into the other end thereof. The rods 32 and 33 are arranged such that during normal transit and in the absence of impact at the couplers 31 the ends thereof abut the opposite ends of the cushioning device. Upon impact, say for example, to the right end of the car, as viewed in FIGS. 1 and 4, whereupon the underframe moves in the direction of the force relatively to the rack 12 which remains substantially stationary due to the inertia of its own weight and the weight of the lading carried thereon, the rods 33 at each of the cushion devices or pockets 26 extend further into the pocket and compress the cushioning devices within the pocket against the opposite end wall thereof and in this manner the cushioning device functions in its normal manner to resist the force of impact and absorb a portion of the energy of such impact so that only a portion of the energy is transmitted to the superstructure 12. Upon impact in the opposite direction, the rods 32 are operative in the same manner as explained above in connection with the impact to the right end of the car.

From the foregoing, it should be readily apparent that the total travel or lengthwise movement of the underframe 11 relative to the superstructure 12 is limited by the length of travel of the cushioning devices employed. In the exemplary structure shown, it is proposed to employ a cushion travel of about 20" and to employ a hydraulic cushioning device embodying the principles of the aforesaid U.S. Patent 3,003,436, so that the relative travel of the underframe 11 with respect to the superstructure 12 is limited to 20" of travel. The length of the superstructure and underframe are proportioned to accommodate such length of travel.

Referring now to the rack superstructure 12 to which the present invention is primarily directed, the sides 21 are heretofore described include generally the upright posts 22 and lower horizontal side channels 23 and upper horizontal side channels 25. The upright posts 22 are each formed from a channel of shallow hat-shaped section. The dimensions of the horizontal web 34, vertical webs 36, and the outwardly extending horizontal flanges 37 are proportioned to impart to the posts 22 the strength characteristics necessary to withstand the longitudinal and transverse stresses to which the posts are subjected by the load carried by the rack structure. The posts 22 are each connected at their lower ends to the side channels 23 associated with the lower deck 17 by way of a gusset 38 welded across the horizontal web 36 and to the vertical web 39 of the side channel 23.

As shown in FIGS. 2, 5, 8, and 9, the side channels 25 associated with the upper decks 18 and 19 are secured to the posts 22 by way of gusset bracket-plates 41 fixed to the vertical webs 42 of the side channels 25, as by welding. The bracket-gusset plates 41 are spaced lengthwise of the channels 25 complementary to the upright posts 22. For securing and firmly fixing the channels 25 and thereby the decks 18 and 19 associated therewith to the side posts, there are provided bolt and nut assemblies 43 associated with complementary openings 43a provided in the posts 22 and bracket gusset plates 41. Fastening the side channels 25 to the side posts 22 in this manner permits the decks 18 and 19 associated therewith to be removed. Adjustment of the intermediate deck 18 to an intermediate higher elevation may be provided by a second set of openings 43b above the first lower set 43a, as shown. In this manner, the intermediate deck 18 may be raised to a height accommodating the height of a truck on the lower deck 17. When the intermediate deck is raised to the second set of openings 43b, the top deck 19 may be removed so that either conventionally standard size passenger vehicles or trucks may be carried on the intermediate deck 18. To preclude the necessity of diagonal cross braces between the posts to prevent longitudinal swaying of the posts, the gussets 38, bracket-gusset plates 41, the upright posts 22 and the side channels 23 are dimensioned and proportioned to form truss sides 21 which are capable of withstanding the longitudinally distributed load applied on the car within permissible limits of stress and deflection.

For the purpose of maintaining the upright posts 22 in in a substantially rigid transverse rectilinear section, while at the same time maintaining the car height at a minimum, the transverse rigidity is imparted adjacent the upper ends of the posts 22. This is in contrast to the structure employed heretofore wherein such transverse rigidity of the posts is accomplished by reinforcing the lower deck and rigidly connecting the posts to the lower deck. Such prior arrangements required a bracing structure on the underside of the bottom deck which increased the overall height of the superstructure. As shown, in accordance with the present invention, the lower deck 17 is formed from sheet material which may be either a continuous sheet or a plurality of sheets joined end-to-end by welding to form an integral continuous sheet. The deck sheet 17 is fixed along its longitudinal edges to the underside of the lower flanges of the side channels 22 as by welding. The deck sheet 17 is not reinforced and is of a thickness such that upon being loaded with the automotive vehicles the sheet 17 tends to flex laterally under the weight of the vehicles supported thereon. Accordingly, the side channels 23 and the upright posts 22 fastened thereto are subject to swaying laterally under the influence of the flexure of the sheet metal deck 17. It may, therefore, be stated that the upright posts 22, in effect, are laterally pivotal about their lower ends. It is to be noted that the sheet deck 17 is substantially devoid of any reinforcing means so that the deck may be positioned in close proximity to the underframe or center sill 13 such that the overall height of the car superstructure 12 is maintained at a minimum.

The requisite transverse or lateral rigidity of the rack structure within permissible elastic deflection thereof is provided by the intermediate and top decks 18 and 19, respectively, either alone or both together. As heretofore explained, the decks are removable and adjustable so that either one or both decks may be attached to the posts 22. As shown in FIGS. 5 to 10, the decks 18 and 19 are of substantially identical structure and are interchangeable from one position to the other. Accordingly, for the purpose of description of the upper deck structure, only the structure of deck 18 will hereinafter be described, it being understood, of course, that the structure of deck 19 is similar. Deck 18 includes a plurality of transverse braces 44 spaced complementary to the upright posts 22. The braces support a plurality of web plates 18a forming the deck proper. The braces 44 are each formed from a channel member of substantially shallow hat-shaped section, having end portions 45 of heavier sections than the intermediate portions 46 and is contoured to provide clearance for an automobile positioned on the lower deck. Each portion 45 and 46 of the hat-shaped section brace members 44 includes a horizontal web 47, vertical webs 48 depending from the latter, and horizontally extending flanges 49. Welded across the underside of the horizontal flanges 49 is a bottom plate 50. The brace 44 is constructed and proportioned to safely assume the loads applied thereto.

The ends 45 of each of the braces 44 are rigidly connected to the respective upright posts 22 at a substantially right angle by way of a gusset assembly 51 fixed to the gusset bracket plates 41 which are fastened to the posts 22 as by bolts and nuts 42a, as heretofore described. As shown particularly in FIGS. 8 and 9, the gusset assemblies 51 each include four gusset brackets 53 arranged in pairs above and below the brace 44 so as to firmly and fixedly hold the respective end portion 45 thereof at substantially right angles to the posts 22. Each of the pairs of upper and lower gussets 53 includes a vertical transverse web 54 providing an inwardly extending bearing edge 55 and depending horizontal longitudinal webs 52 bent to provide longitudinal bearing edges 56. The upper and lower pairs of gusset brackets 53 are fixedly secured to the gusset plate 41 and the side channel along their respective mating edges as by welding, and are arranged in opposing relationship so that the inward and longitudinal bearing edges 55 and 56 of the upper gussets contact the brace horizontal web 46 and the lower pair of gussets contact the plate member 50. The gussets 53 are located so that the inward bearing edges 55 are in substantial alignment with the vertical webs 48 of the brace 44 and the bearing faces or edges 55 span substantially the entire width of the horizontal web 50 thereof to further rigidify the connection of the brace 44 with the gusset brackets 53, a reinforcing web 57 is welded to the inner walls of the brace 44 in alignment with the longitudinal bearing edges 56.

From the foregoing, it should be readily apparent that when a load is applied on the decks 18 or 19 by the automotive vehicles carried thereon, the transverse bending caused by the load is assumed by the braces and the rigid right-angular connection provided by the gusset assembly 51 carried by and affixed to the plate gusset 41 fixed to the upright posts 25 preclude the latter from being deflected beyond their permissible elastic deflection so that the posts 22 are maintained transversely spaced in a substantially rigid rectilinear section in the presence of a load on the decks 17, 18, or 19.

As heretofore described, the deck plates 18a are formed of web sheets and, as shown in FIG. 9, the opposing transverse edges are fixed to the cross braces 44 in spaced end-to-end relationship in depressions 58 provided along each side of the horizontal web 47 of the brace 44. The depressions 58 are of sufficient depth to maintain the upper surface of the webs 18a substantially coplanar with the upper surface of the horizontal web 47.

Along the longitudinal edge portions of each of the webs 18a there is formed a longitudinally extending vertical depending web 59 from the bottom of which there is bent a horizontal web portion 61. The depressed horizontal web portion 59 is fixed along its free longitudinal ends as by welding, to the lower flange 62 of the side channels 23. Formed along its transverse edge the horizontal web portion 61 is provided with a tab 61a which is fixed by welding to the vertical webs 49 of the brace 44. The longitudinally extending vertical depending web 58 is effective to increase the section of the deck plates 18a spanning the braces 44 so that the deck plates 18a are strengthened to withstand the longitudinal stresses and deflections created by the load being carried on the car. Moreover, the longitudinal ends so formed with vertical webs 59 and depressed horizontal webs 61 conveniently form a drainage well 63 for receiving the lubricant droppings and the like discharged from the automotive vehicles being carried. To provide drainage for the wells, the horizontal webs 58 may be formed with drainage holes 64 as shown in FIG. 10.

Each of the decks 17, 18, and 19 is provided with hold-down bulb angles 64 extending lengthwise of the car and spaced so that the wheels of the vehicles being carried on the deck straddle the same. As shown, the typical hold-down bulb angles 64 are fixed to the deck webs 17 and 18a respectively, as by welding, and the vertical flanges 65 thereof are formed with spaced opening 66 located below bulbs 67 for receiving the usual hold-down chains employed to hold the vehicles fixed on the car 10. Advantageously, the lengthwise extending bulb angles 62 impart longitudinal strength to the webs forming the decks 17, 18, and 19.

In the identical upper deck structures 18 and 19, to achieve the longitudinal strength characteristics along the continuous length of the decks between the spaced transverse end of web sheets 18a which are spaced as shown in FIG. 7 by the horizontal web of the brace 44, the bulb angle 62 is formed in sections 62a with each section 62 extending the length of the web sheets 18a. Joining the adjacent spaced sections 62a at each of the braces 44 is an intermediate T-shaped bulb angle section 62b which is fixed along its horizontal flange to the horizontal web 48 of the brace 44 and at its bulb section 67b to the bulb sections 67 of the adjacent sections 62a as by welding. In this manner, the hold-down bulb angles 62a on the decks 18 and 19 are, in effect, continuous for the full length of the upper decks so as to impart the additional longitudinal strength characteristics to the deck structure.

From the foregoing it should be readily apparent that the upper decks 18 and 19 are each provided with longitudinal strength characteristics by way of a combination of the vertically depending webs 59 extending between the braces 44 and the bulb angles 62 extending the full length of the deck structures. On the lower deck, the necessary longitudinal rigidity is provided by the bulb hold-down angles 62.

What is claimed is:

1. A railway car comprising an underframe, a superstructure, means mounting said superstructure on said underframe for relative lengthwise movement thereof, said superstructure including opposing open frame sides having a plurality of lengthwise spaced opposing pairs of upright posts, lower deck means including opposing lower side channels extending along said open frame sides, lower deck sheet means extending substantially continuously lengthwise of said superstructure and fixed along the longitudinal opposing edges thereof to said lower side channels, said lower deck sheet means being substantially devoid of transverse bracing so as to be subject to transverse flexing upon being loaded, said upright posts being fixed at the lower ends thereof to said lower side channels, and upper deck means vertically spaced above said lower deck means, said upper deck means including transversely extending bracing means fixedly secured between opposing pairs of said upright posts so as to maintain a substantially fixed angular relationship with said upright posts and thereby to impart transverse rigidity to said superstructure.

2. The invention as defined in claim 1 wherein said upper and lower deck means each include transversely spaced cargo tie down means extending continuously for the length of said deck means to impart longitudinal rigidity to said deck means.

3. The invention as defined in claim 2 wherein said upper deck means are detachably fixed to said upright posts.

4. A railway car comprising an underframe including a center sill, bolster spaced inwardly from each end of said center sill, and cross-bearers spaced lengthwise of said sill between said bolsters and having the outboard ends thereof detached from each other and from said bolsters; a multi-deck superstructure, means mounting said superstructure on said bolster and said free ends of said cross-bearers for lengthwise movement relative to said underframe, a lower deck including lower side channels extending lengthwise of said superstructure along the opposite sides thereof, a plurality of lengthwise spaced upright posts fixed at the lower ends to said lower side channels along each side of said superstructure, said lower deck including sheet means extending substantially continuously between said lower side channels and fixed thereto along the longitudinal edges, said sheet means being substantially devoid of transverse bracing so as to be transversely flexible upon being loaded whereby said upright posts connected to said lower side channels are subject to lateral swaying, an upper deck including upper side channels along each of said sides and spaced above said side channels, said upper deck further including sheet means extending lengthwise of said car and transverse brace means spaced lengthwise of said car, and means rigidly connecting said transverse braces to said upright posts and said upper side channels so that said upright posts are maintained in a substantially vertical plane relative to said underframe.

5. A railway car comprising an underframe, a multi-deck superstructure, means movably mounting said superstructure on said underframe for lengthwise movement thereof, said superstructure having opposing sides of open frame construction, said open frame sides each including vertically spaced and horizontally extending lower and upper side channels and a plurality of upright posts attached to and spaced lengthwise along said lower and upper side channels, a lower lading carrying deck extending substantially continuously lengthwise of said superstructure and fixed along the opposite edges thereof to said lower side channels, said lower lading carrying deck being substantially devoid of transverse bracing so as to be transversely flexible whereby said upright posts attached to said lower side channels at the lower ends thereof are subject to transverse bending at the upper ends when said lower lading carrying deck is loaded, said upper lading carrying deck comprising a plurality of lengthwise spaced transverse braces extending between opposing ones of said upper side channels, sheet means longitudinally spanning said braces and transversely extending between said upper side channels to form a deck portion extending lengthwise of said superstructure, said sheet means including an offset portion formed along the opposite longitudinal edges thereof, said offset portions each including a vertical web and a horizontal web, means fixing each of said horizontal webs to respective ones of said upper side channels, and gusset means fixedly and rigidly securing said braces to said open frame sides so as to maintain a substantially fixed angular relationship between said braces and said upright posts.

6. The invention as defined in claim 5 wherein said horizontal webs include longitudinally spaced openings.

7. The invention as defined in claim 5 wherein said sheet members are fixed along transverse edges thereof to said brace means.

8. The invention as defined in claim 5 wherein said vertical webs of said longitudinally extending offset portions span adjacent ones of said braces to impart longitudinal rigidity to said upper deck.

9. The invention as defined in claim 8 wherein transversely spaced longitudinally extending angle members are fixed to said sheet members and said braces to impart longitudinal rigidity to said upper deck.

References Cited by the Examiner

UNITED STATES PATENTS

| | | | |
|---|---|---|---|
| 1,263,788 | 4/18 | Michod | 105—368 |
| 1,276,556 | 8/18 | Michod | 105—368 |
| 1,693,193 | 11/28 | Duryea | 105—454 |
| 1,840,705 | 1/32 | Eichelberger | 296—1 |
| 1,894,534 | 1/33 | Dolan | 105—368 |
| 2,047,955 | 7/36 | Fitch | 105—454 |
| 2,336,440 | 12/43 | Kass | 105—370 |
| 2,561,927 | 7/51 | Janeczko | 105—370 |
| 2,695,810 | 11/54 | Demos | 105—368 |
| 2,838,338 | 6/58 | Kerley et al. | 296—1 |
| 2,873,693 | 2/59 | Chapman et al. | 105—368 |
| 2,953,996 | 9/60 | Allen | 105—404 |
| 2,991,733 | 7/61 | Shaver et al. | 105—409 |
| 3,099,230 | 7/63 | De Podesta | 105—368 |

OTHER REFERENCES

Article entitled "What's New in Rolling Stock," page 23, Railway Age Magazine of Feb. 15, 1960.

Article entitled "ACF Markets Cushioned Auto Racks," page 28, Railway Age Magazine of Dec. 5, 1960.

MILTON BUCHLER, *Primary Examiner.*

JAMES S. SHANK, LEO QUACKENBUSH,
*Examiners.*